(12) United States Patent
Shoemaker

(10) Patent No.: US 7,690,580 B2
(45) Date of Patent: Apr. 6, 2010

(54) TRANSACTION CARDS HAVING DYNAMICALLY RECONFIGURABLE DATA INTERFACE AND METHODS FOR USING SAME

(76) Inventor: Austin William Shoemaker, P.O. Box 15083, Stanford, CA (US) 94309

( * ) Notice: Subject to any disclaimer, the term of this patent is extended or adjusted under 35 U.S.C. 154(b) by 0 days.

(21) Appl. No.: 11/561,366

(22) Filed: Nov. 17, 2006

(65) Prior Publication Data

US 2008/0116285 A1    May 22, 2008

(51) Int. Cl.
*G06K 19/06* (2006.01)
*G06K 7/08* (2006.01)

(52) U.S. Cl. .................. 235/493; 235/375; 235/380; 235/449

(58) Field of Classification Search .......... 235/380, 235/492, 493, 449, 375
See application file for complete search history.

(56) References Cited

U.S. PATENT DOCUMENTS

| 5,397,881 | A | * | 3/1995 | Mannik ................. 235/380 |
| 5,786,587 | A | * | 7/1998 | Colgate, Jr. ............. 235/487 |
| 5,834,747 | A | * | 11/1998 | Cooper ................. 235/449 |
| 5,834,756 | A | * | 11/1998 | Gutman et al. ........... 235/493 |
| 7,083,094 | B2 | * | 8/2006 | Cooper ................. 235/449 |
| 7,163,148 | B2 | * | 1/2007 | Durbin et al. ............ 235/449 |

| 2003/0057274 | A1 | | 3/2003 | Dawson |
| 2004/0035942 | A1 | * | 2/2004 | Silverman ............... 235/493 |
| 2004/0084528 | A1 | * | 5/2004 | Moriya et al. ............ 235/449 |
| 2004/0133787 | A1 | * | 7/2004 | Doughty et al. ........... 713/186 |
| 2005/0092830 | A1 | | 5/2005 | Blossom |
| 2005/0133606 | A1 | * | 6/2005 | Brown ................... 235/493 |
| 2005/0222904 | A1 | | 10/2005 | Cotten et al. |
| 2006/0161789 | A1 | * | 7/2006 | Doughty et al. ........... 713/186 |

OTHER PUBLICATIONS

"International Search Report", Issue in PCT Application No. PCT/US2007/085145; Mailing Date: Mar. 21, 2008.
"Written Opinion", Issue in PCT Application No. PCT/US2007/085145; Mailing Date: Mar. 21, 2008.
"International Preliminary Report on Patentability", Issued in PCT Application No. PCT/US2007/085145; Mailing Date: May 28, 2009.

* cited by examiner

*Primary Examiner*—Thien M. Le
*Assistant Examiner*—Tuyen K Vo
(74) *Attorney, Agent, or Firm*—IP Strategy Group, P.C.

(57) ABSTRACT

Apparatuses and methods backward compatible with existing card processing infrastructure are provided to furnish dynamically configurable data to a card reader to facilitate transactions such as credit card transactions. The inventive apparatuses and methods are operable even with card readers configured to read statically implemented data, such as statically implement magnetic stripe data and/or statically printed bar codes. Techniques are also provided to take advantage of features of the inventive apparatus and method to substantially reduce or to eliminate transaction fraud and to improve efficiency for cardholders, card issuers, and intermediary institutions.

36 Claims, 11 Drawing Sheets

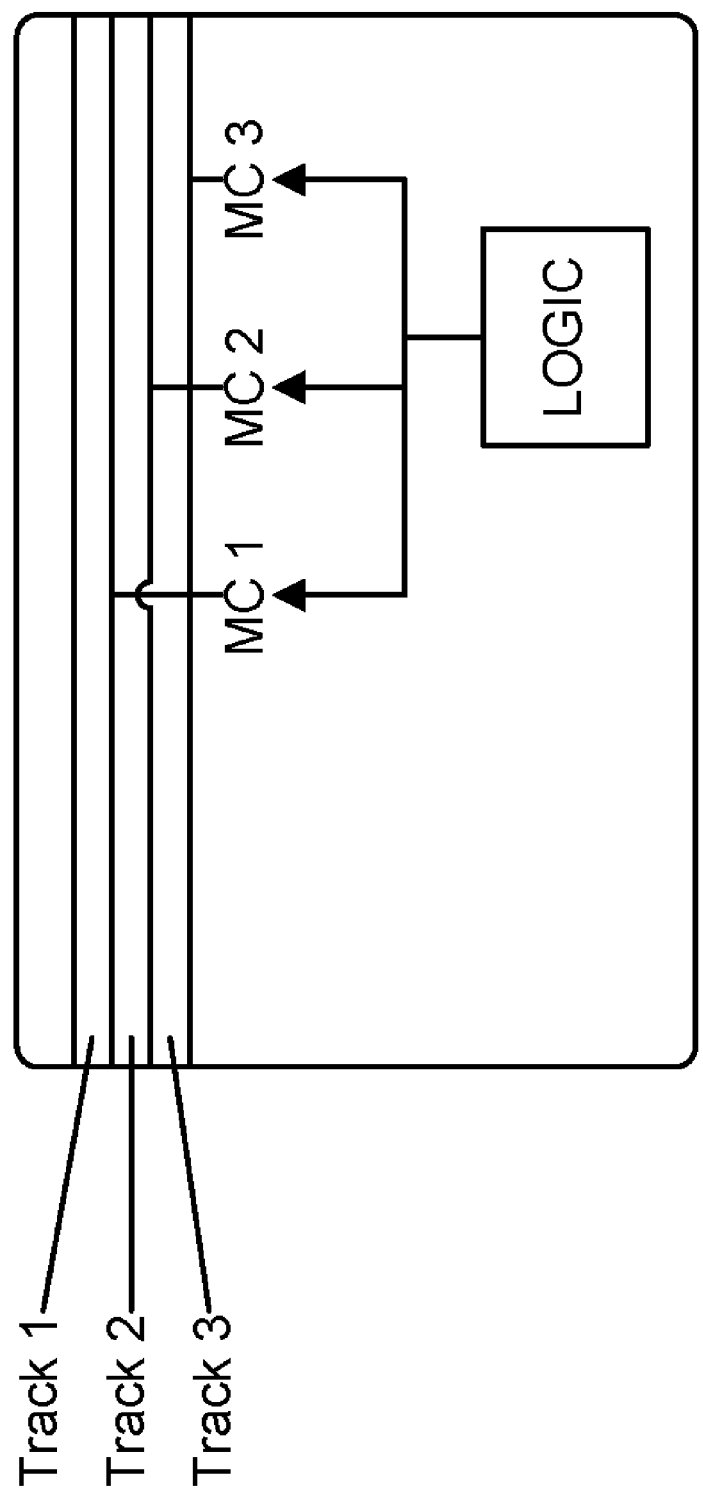

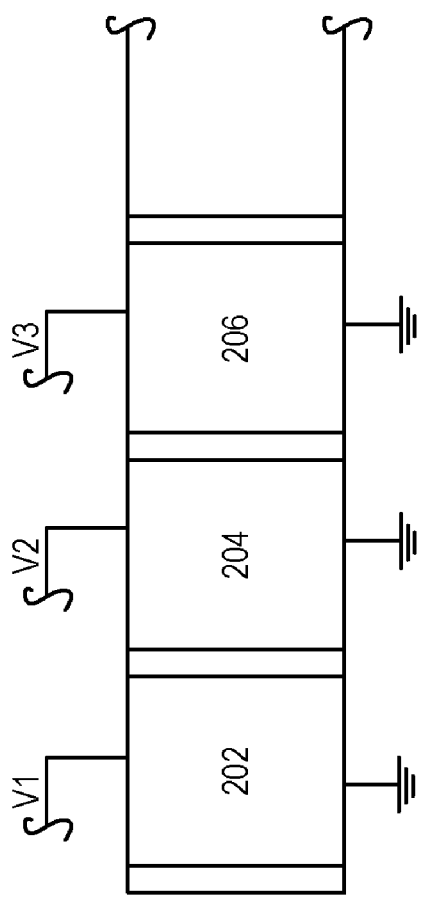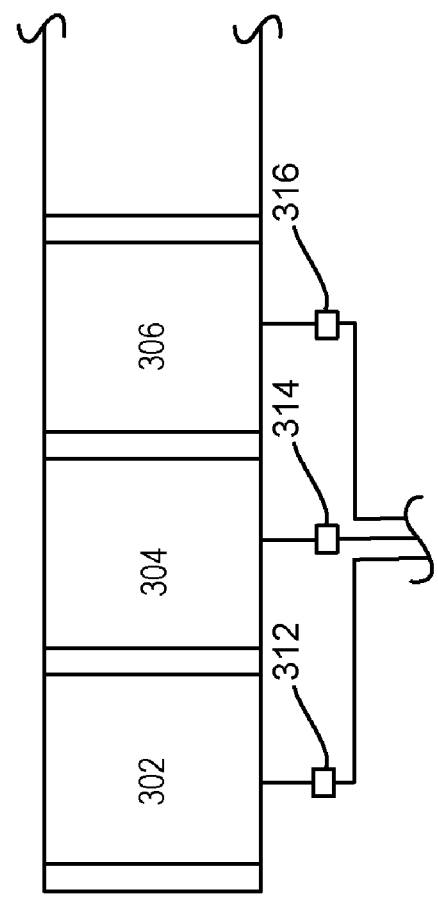

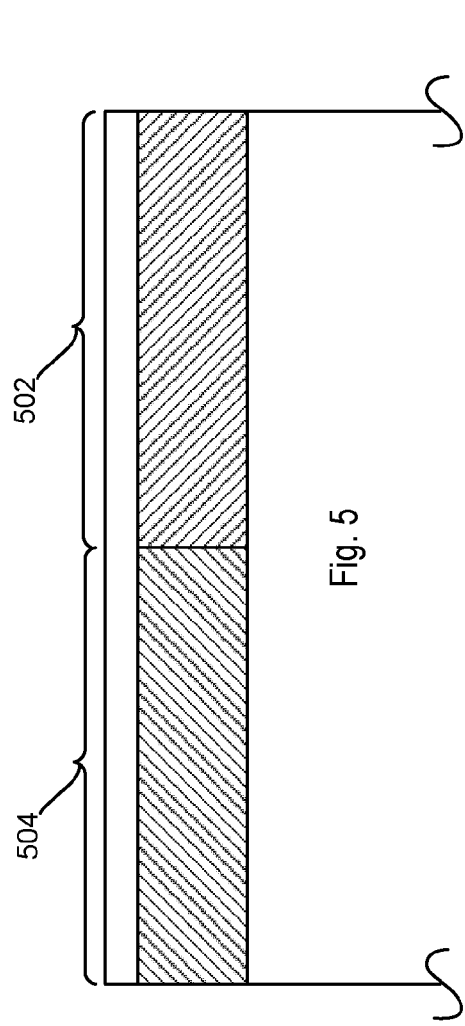
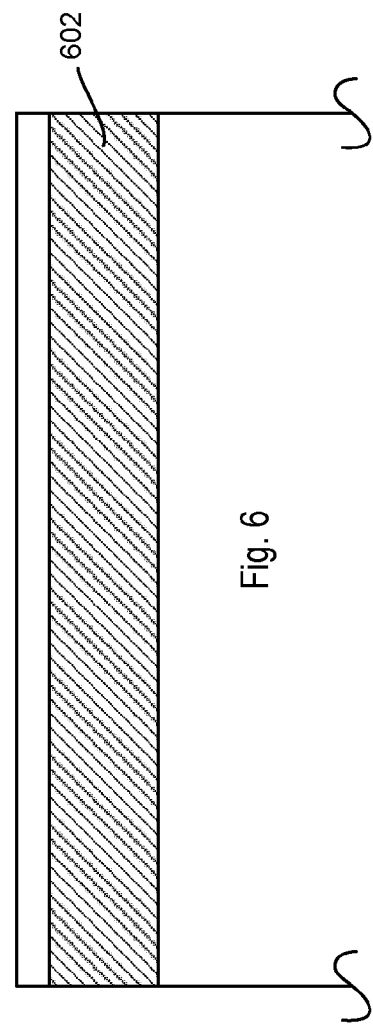

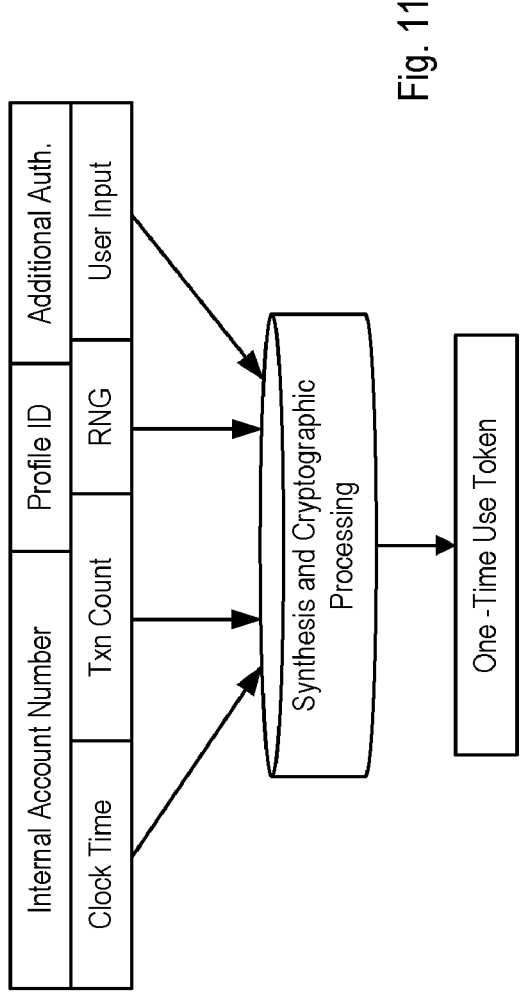

TRANSACTION CARDS HAVING DYNAMICALLY RECONFIGURABLE DATA INTERFACE AND METHODS FOR USING SAME

BACKGROUND OF THE INVENTION

Magnetic stripe cards, e.g., credit cards, debit cards, membership cards, and the like, have long been employed to facilitate commerce and for identification purposes. Generally speaking, a magnetic stripe card includes a plastic or metallic card base on which a magnetic stripe is affixed. The information necessary to conduct a transaction (such as a purchase of goods/services or an identification query) is embedded in the magnetic stripe on the card. Many cards also include visually perceptible or human-readable data embossed or printed directly on the card itself. The data embedded in the magnetic pattern and the visually perceptible data may be used alternatively or together by the cardholder to accomplish a transaction.

In this document, credit cards will be employed as examples. However, the problems and solutions discussed herein are not limited to credit cards and may apply to all magnetic stripe cards irrespective of the purpose for which they are employed.

Contemporary credit cards, which are representative of magnetic stripe cards, are widely employed to facilitate the purchase of goods and services by cardholders. To facilitate discussion, a description of a typical credit card transaction is provided. Suppose, for example, a cardholder wishes to purchase a book using his credit card. If the purchase is performed in a manner that does not require the physical handling of the card by the merchant or the physical presence of the card (such as an online purchase), the cardholder may provide the credit card information (e.g., credit card number, expiration date, security code, cardholder's name and address, etc.) by furnishing some of the required information off the surface of the card itself. If the purchase is performed at a point-of-sale terminal (such as at the cash register in the bookstore), the cardholder or the store's clerk may swipe the card through a magnetic card reader to provide the credit card information directly from the magnetic stripe itself.

The credit card information, along with the merchant's information and the cost of the book that the cardholder wishes to purchase, may then be communicated by the merchant's device via a telecommunication network (e.g., the Internet or some other network) to one or more transaction processing servers. The transaction processing servers of the acquiring bank work cooperatively with databases of the institution that issues the credit card to, for example, ascertain whether the account associated with the given credit card has sufficient available credit to cover the cost of the book, whether the transaction appears fraudulent based on fraud detection algorithms, etc. If the transaction is approved, the approval information is relayed back to the merchant, who then allows the cardholder to complete the purchase. If the transaction is not approved, the denial information is relayed back to the merchant, who then rejects the attempted transaction. The above-described sequence of steps and the infrastructure mentioned are typical today, although there may be variations on the theme depending on specific implementations.

Although credit cards are widely used and there exists an extensive magnetic stripe card processing infrastructure comprising card readers, communication infrastructure, transaction processing systems and issuing bank databases, etc., to facilitate commerce using credit cards, the current credit card implementation is inherently insecure and far from being convenient/efficient/secure for cardholders, merchants, and card issuers.

For example, the wallet of a typical consumer may contain half a dozen or more magnetic stripe cards, including credit cards, each of which is associated with a different account. Since these credit cards have expiration dates, they need to be reissued from time to time. There exists a non-trivial cost associated with the issuance, updating, and/or renewal of the multiple credit cards for card issuers. For the cardholders, it is burdensome to carry and keep track of multiple credit cards. The burden is felt most acutely if, for example, the wallet is stolen and the cardholder must remember the cards that he or she possessed, and must find the contact information of the individual issuing banks in order to contact the individual issuing banks and, in a timely manner alert the issuing banks to possible fraudulent use of the stolen or lost credit cards. The existence of multiple credit cards also complicates or renders difficult the process of replacing lost cards.

Furthermore, credit cards tend to be passive devices. In other words, the data that is printed on the card surface and embedded in the magnetic stripe of a credit card is fixed and cannot be changed without having the card reissued. Because the typical credit card is passive, the same data is designed to be furnished to different vendors and is employed by different vendors to facilitate different transactions at different times. For example, the same credit card information (e.g., credit card number, expiration date, cardholder's name, etc.) furnished to a bookstore today is also furnished to the grocery store next week to accomplish the purchase of books and groceries respectively.

Given the fact that the credit card information is in human readable form on the card surface itself (typically comprising no more than a few dozen alphanumeric characters to represent the aforementioned credit card number, expiration date, cardholder's name, etc.), such credit card information is highly vulnerable to being snooped by another human being nearby, thus potentially exposing the cardholder and issuing bank to fraud-related losses.

The fixed magnetic code pattern on the typical credit card is also inherently insecure. As mentioned, in a typical point-of-sale transaction (such as at the grocery store), the cardholder provides the merchant with the credit card information by either handing a clerk the credit card or by swiping the credit card through a card reader. This approach is inherently insecure because the magnetic code pattern, being a fixed pattern that is designed to be reused from transaction to transaction, can be easily stored and then cloned and/or copied onto a blank card by a dishonest merchant or sales clerk. Since the data pattern is fixed and intended to be reusable for different transactions, once the credit card information is stolen, the cloned card or copied card information can be used until the fraud is detected at some later time, typically by the cardholder upon receiving a large bill from the card issuer for items he did not purchase or, in some cases, by the card issuer's fraud detection software upon detecting unusual or suspicious patterns of transaction attempts.

Even if fraud is not involved, the magnetic stripes in today's credit cards are fragile and susceptible to damage. For example, cardholders have long experienced situations wherein their cards are inadvertently demagnetized by another credit card or a magnet or by a stray electromagnetic field.

As can be appreciated from the foregoing, today's magnetic stripe card implementations leave much room for improvement.

SUMMARY OF INVENTION

The invention relates, in an embodiment, to an active stripe card compatible with a magnetic stripe card reader that is configured to read statically implemented magnetic stripe cards, the active stripe card being configured to exchange data with the magnetic stripe card reader. The active stripe card includes a card base and a dynamically reconfigurable data interface disposed on the card base. The dynamically reconfigurable data interface having at least a set of dynamically reconfigurable data bearing portions that includes at least a first dynamically reconfigurable data bearing portion. The reconfiguration controller circuitry is coupled to the set of dynamically reconfigurable data bearing portions. The control logic circuitry is coupled to the magnetizing controller circuitry. The control logic circuitry is configured to provide a first data pattern to the reconfiguration controller circuitry to cause a second data pattern that includes at least a portion of the information contained in the first data pattern to be manifested on the dynamically reconfigurable data interface, thereby rendering the second data pattern to be readable by the magnetic stripe card reader, wherein the second data pattern manifested by the dynamically reconfigurable data interface for a first transaction is different from the second data pattern manifested by the dynamically reconfigurable data interface for a second transaction.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows, in an embodiment, a volatile implementation wherein dynamically reconfigurable data interface is divided into a plurality of volatilely configurable data bearing portions.

FIG. 3 shows, in an embodiment, a volatile implementation wherein dynamically reconfigurable data interface is divided into a plurality of non-volatilely configurable data bearing portions.

FIG. 5 shows this implementation wherein only a part of the interface that is employed to provide data to the card reader is dynamically configurable.

FIG. 6 shows this implementation wherein the entire interface that is employed to provide data to the card reader is dynamically configurable.

FIG. 11 shows, in accordance with an embodiment of the invention, the various data items that may be employed to generate the one-time use token.

FIG. 12 shows an implementation wherein the one-time use token may be combined with other data to generate the data stream to be provided to the card reader.

DETAILED DESCRIPTION OF EMBODIMENTS

Figure 1A:
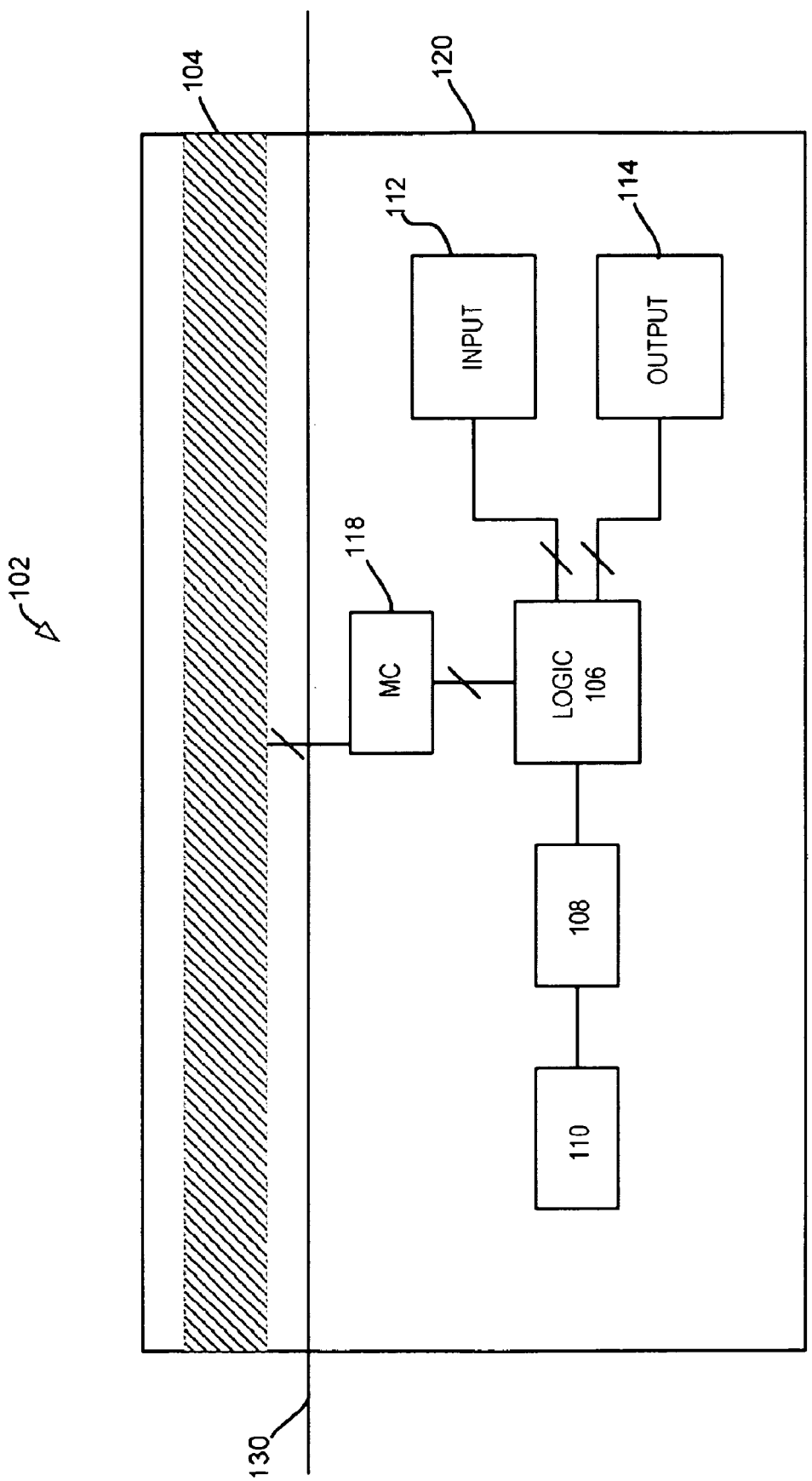
FIG. 1A shows, in accordance with an embodiment of the invention, an active credit card having a dynamically reconfigurable data interface disposed on FIG. 1B shows, in accordance with an embodiment of the invention, an implementation wherein the data is provided in multiple tracks.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed, and may include a combination of a computer/computing device and dedicated/programmable circuits adapted for the various tasks pertaining to embodiments of the invention.

In accordance with embodiments of the invention, there is provided an active magnetic stripe card having a dynamically reconfigurable data interface that is compatible with existing magnetic stripe card processing infrastructure. As the term is employed herein, the active magnetic stripe card's data interface represents the portion of the card that is employed to exchange data with existing magnetic stripe readers or with magnetic stripe readers that are compatible with existing magnetic stripe card processing infrastructure. An example of an existing magnetic stripe card processing infrastructure includes a magnetic stripe card reader that is configured to read a statically implemented magnetic stripe card (i.e., a card whose data implemented on the magnetic stripe does not change from transaction to transaction).

The data interface of the active credit card is dynamically reconfigurable in that the data provided through the dynamically reconfigurable data interface can be changed by onboard logic to provide enhanced anti-fraud protection and to improve efficiency for cardholders, merchants, and card issuers. Significantly, the active magnetic stripe card of the invention is backward compatible with existing magnetic stripe card processing infrastructure, requiring no change or little change (if additional capabilities are desired) to the existing magnetic stripe card processing infrastructure.

As mentioned, credit cards will be employed as examples herein. However, the issues addressed herein apply equally to all cards that are configured to provide data to a card reader having a reader head that is capable of reading data off a magnetic stripe. In an embodiment, the active credit card is provided with onboard logic to reconfigure the data interface to implement multiple accounts in a given physical card. In other words, a single physical card can now take on the personalities of multiple accounts and even multiple profiles per account. Responsive to the cardholder's selection, the credit card information associated with the selected account and/or selected profile is provided to the merchant to accomplish a proposed transaction. Accordingly, it is no longer necessary for the consumer to carry a large number of cards to have access to multiple different accounts.

In an embodiment, the active credit card provides active anti-fraud protection by dynamically modifying the data pattern provided to merchants such that different transactions would require different data patterns. Since the data interface can be dynamically reconfigurable, the data pattern provided to the merchant for a given transaction may, in an embodiment, represent a one-time use token and may not be reused for subsequent transactions. Accordingly, even if the data pattern provided by the active credit card of the invention is snooped by another person or another device, that data pattern is only useable for the single transaction that has already been conducted and may not be reused for a subsequent fraudulent transaction to the detriment of the cardholder.

These and other features and advantages of embodiments of the invention may be better understood with reference to the figures and discussions that follow.

FIG. 1A shows, in accordance with an embodiment of the invention, an active credit card 102 having a dynamically reconfigurable data interface 104 disposed on (e.g., attached to or formed on) a card base 120, which is typically made of a suitable material such as clear or opaque plastic. Dynamically reconfigurable data interface 104 represents the data interface that is compatible with existing magnetic stripe card processing infrastructure. However, since data interface 104 can be dynamically reconfigurable to provide different data at different times, techniques can be provided to improve efficiency and to render the active credit card 102 more resistant to fraud.

Active credit card 102 includes a logic circuit 106, representing the electronic circuitry (such as ASIC logic, processor, clock, volatile and/or nonvolatile memory, etc.) employed to generate data for programming the data pattern that appears on dynamically reconfigurable data interface 104. As will be discussed herein, logic circuit 106 may include for example an encryption engine and data fetching logic for fetching, for example, account information and encrypting the account information before providing the account information to the dynamically reconfigurable data interface for reading by the magnetic card reader. The encryption engine may implement any suitable encryption scheme including for example public key encryption or pre-shared key transcription.

The data generated logic circuit 106 is then provided to a reconfiguration controller, such as a magnetizing controller 118, which generates the appropriate electrical signals to configure data interface 104 such that the data that appears on dynamically reconfigurable data interface 104 can be read by an existing magnetic stripe card reader.

Power to logic circuit 106 and the rest of card 102 may be provided by an onboard battery 108. Battery 108 may be recharged and/or augmented by a power source or a power interface 110 which may represent, for example, a photovoltaic cell, piezoelectric generator, or a contact or non-contact electrical coupling in order to charge battery 108. Battery 108 may be optional, in an embodiment.

There is also shown an optional cardholder input arrangement 112 representing, for example, a conventional data input device such as a set of buttons or a touch screen or a scroll wheel and/or a biometric device (e.g. fingerprint scanner) to allow the cardholder to input data into active credit card 102. Feedback arrangement 114 is also provided to provide visual feedback to the cardholder. Feedback arrangement 114 may be implemented by light diodes or by an LCD display or by auditory or tactile feedback, for example.

To accomplish a transaction, logic circuit 106 provides data to magnetizing controller 108 to enable magnetizing controller 108 to dynamically reconfigure data interface 104, thereby transmitting a data pattern to a magnetic stripe card reader (conventional and not shown in FIG. 1A). It is contemplated that the information transferred between card 102 and the magnetic card reader can be either half duplex (i.e., one direction from card 102 to the card reader) or bidirectional (i.e., from card 102 to a magnetic card reader and from the magnetic card reader to card 102).

In an embodiment, active credit card 102 is designed to have roughly the same physical form factor as the credit card that it replaces. However, active credit card 102 may be implemented using any suitable physical form factor as long as dynamically reconfigurable data interface 104 can be read by a magnetic stripe card reader. Accordingly, in an embodiment, the portion below line 130 in FIG. 1A may be made as thick as necessary to accommodate circuitry and/or power components while the card portion above line 130 may be made thinner to accommodate existing magnetic stripe card readers, which may require dynamically reconfigurable data interface 104 to fit in a sliding slot of the magnetic stripe reader for swiping.

In one or more embodiments, the data in the dynamically reconfigurable data interface may be provided in multiple tracks. FIG. 1B shows, in accordance with an embodiment of the invention, such an implementation wherein the data is provided in multiple tracks (Track 1, Track 2, and Track 3). Thus data may be segmented into fields addressable not only by the position along the track but also the specific track number. These fields may be represented (e.g., programmed or encoded) by different magnetizing controllers MC 1, MC 2 and MC 3 as shown. Different tracks may contain different data or may contain redundant data to improve reading accuracy and/or reliability.

As mentioned, magnetizing controller 108 programs dynamically reconfigurable data interface 104 to provide the appropriate data pattern to a magnetic stripe card reader. FIG. 2 shows, in an embodiment, a volatile implementation wherein dynamically reconfigurable data interface 104 is divided into a plurality of data bearing portions, such as discrete magnetic stripe portions 202, 204, and 206. Although only four discrete magnetic stripe portions are shown, dynamically reconfigurable data interface 104 may be divided into as many discrete magnetic stripe portions as necessary to accommodate the data requirement of the magnetic stripe card processing infrastructure.

With reference to FIG. 2, discrete magnetic stripe portions 202, 204, and 206 represent dynamically reconfigurable data bearing portions and are typically unbiased. During use (e.g., just prior to conducting a transaction with the card), appropriate magnetizing charge may be provided to each discrete magnetic stripe portion to independently bias individual ones of the discrete magnetic stripe portions to represent different data values. As such, the reconfiguration of the discrete magnetic stripe portions with different data values is performed at or just prior to transaction time, and this reconfiguration may take place for each transaction if desired. To clarify, the dynamic re-configurability discussed herein refers to the ability of the card to have its dynamically reconfigurable data interface manifest different values (e.g., vary from transaction to transaction) during field usage.

These data values are then read by a magnetic stripe card reader head as the card is swiped through the magnetic stripe card reader. Following the transaction, the charges applied to discrete magnetic stripe portions 202, 204, and 206 are removed to conserve power and the magnetizing patterns in these discrete magnetic stripe portions can either stay latched to the last values or, more typically, become unbiased again. Since the dynamically reconfigurable data bearing portions lose the data values when the magnetizing charge(s) is/are removed, the dynamically reconfigurable data bearing portions are said to be volatilely reconfigurable in the implementation of FIG. 2.

FIG. 3 shows, in accordance with another embodiment of the invention, a nonvolatile implementation wherein the discrete magnetic stripe portions in dynamically reconfigurable data interface 104 are permanently latched to data values even after the magnetizing charge is removed. In this sense, permanent latching does not imply that the reconfigurable data bearing portions cannot be changed. Permanent latching in this context means that when the magnetizing charge is removed, the reconfigurable data bearing portions do not lose their data values and the data values can be read by a card reader without the magnetizing charges being present. Since the dynamically reconfigurable data bearing portions retain the data values when the magnetizing charge(s) is/are removed, the dynamically reconfigurable data bearing portions are said to be permanently reconfigurable in the implementation of FIG. 2.

In the example of FIG. 3, discrete magnetic stripe portions 302, 304, and 306 are latched by programming circuits 312, 314, and 316, respectively, to the desired data values. Latching may be performed by changing the polarization or the magnetic orientation of the magnetic particles on the discrete magnetic stripe portions, thereby locking these discrete magnetic stripe portions to the desired data values until changed again by programming circuits 312, 314, and 316. In contrast to the implementation of FIG. 3, when the magnetizing charge is removed, the discrete magnetic stripe portions retain their data values instead of simply becoming unbiased again.

Figure 4:
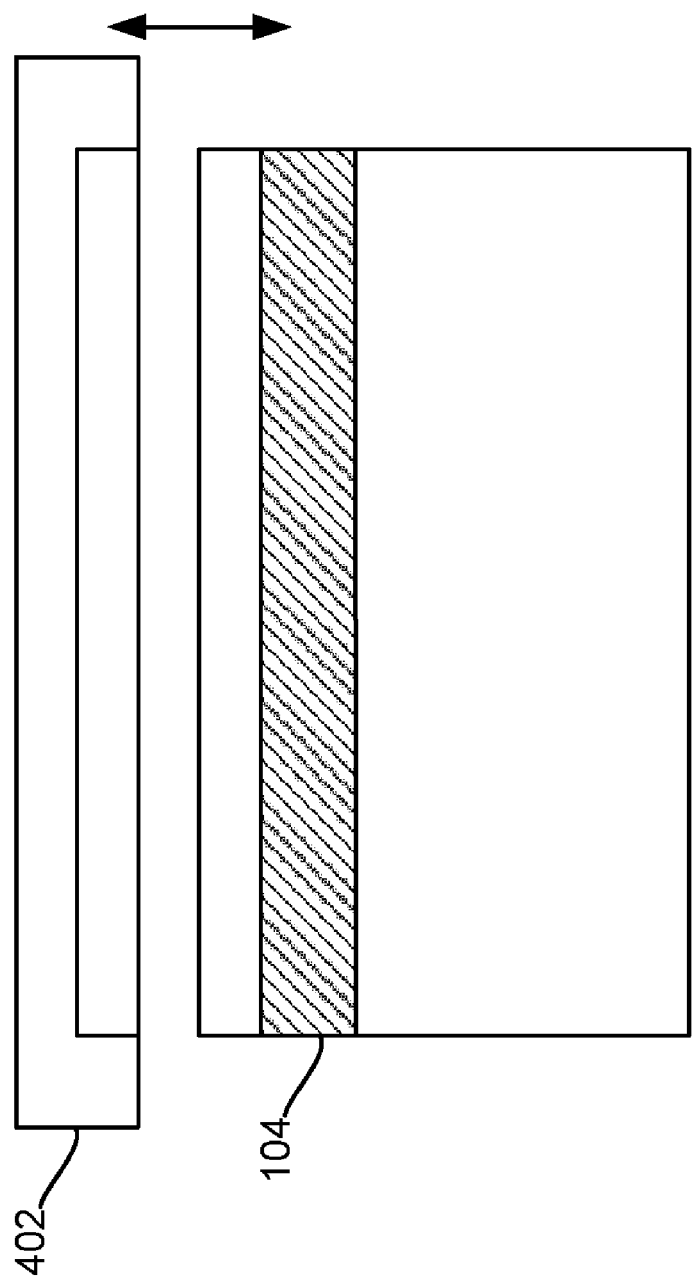
FIG. 4 shows, in accordance with an embodiment of the invention, another implementation for changing the data values on dynamically reconfigurable data interface.

FIG. 4 shows, in accordance with an embodiment of the invention, another implementation for changing the data values on dynamically reconfigurable data interface 104. In FIG. 4, dynamically reconfigurable data interface 104 may be changed by an external device 402 that works either by itself or cooperatively with logic circuit 106 to change the data values in dynamically reconfigurable data interface 104.

In an embodiment, it is anticipated that a portion of the credit card information required by the existing magnetic stripe card reader infrastructure in order to complete a transaction does not change from transaction to transaction. For example, the name of the cardholder and/or the cardholder's billing address are data items that are not expected to change from transaction to transaction. Accordingly, it is possible to implement the dynamically reconfigurable data interface 104 to dynamically vary only a portion of the data pattern required to complete a transaction.

FIG. 5 shows this implementation wherein only data pattern portion 502 needs to be dynamically reconfigurable. For example, data pattern portion 502 may furnish data pertaining to the cost of the item to be purchased, the transaction time, the transaction sequence number, etc. The other data pattern portion 504 representing, for example, the cardholder's name may be statically implemented in a static data-bearing portion (i.e., not reconfigurable from transaction to transaction) of the card. Together, the data pattern that is the result of combining data pattern portion 502 and data pattern portion 504 still varies from transaction to transaction, rendering the active credit card of the invention more resistant to fraud and rendering it possible to implement features such as multiple accounts, multiple profiles, etc.

In another embodiment, the entire data pattern may be dynamically generated and/or reconfigured, and provisioned to dynamically reconfigurable data interface 104 to accomplish a transaction. FIG. 6 shows this implementation wherein the entire data pattern 602 can be dynamically reconfigured by the circuitry in active credit card 102 for each transaction to accomplish the transaction. The implementation of FIG. 6 has the advantage of providing more flexibility and security.

In the prior art, variations in the swiping speed have oftentimes caused the magnetic stripe reader to fail to read the data pattern on the prior art credit card. In accordance with an embodiment of the invention, the dynamically reconfigurable data interface is configured such that data can be reliably provided to the magnetic reader head irrespective of the speed at which the card is swiped through the magnetic stripe card reader.

Figure 7:
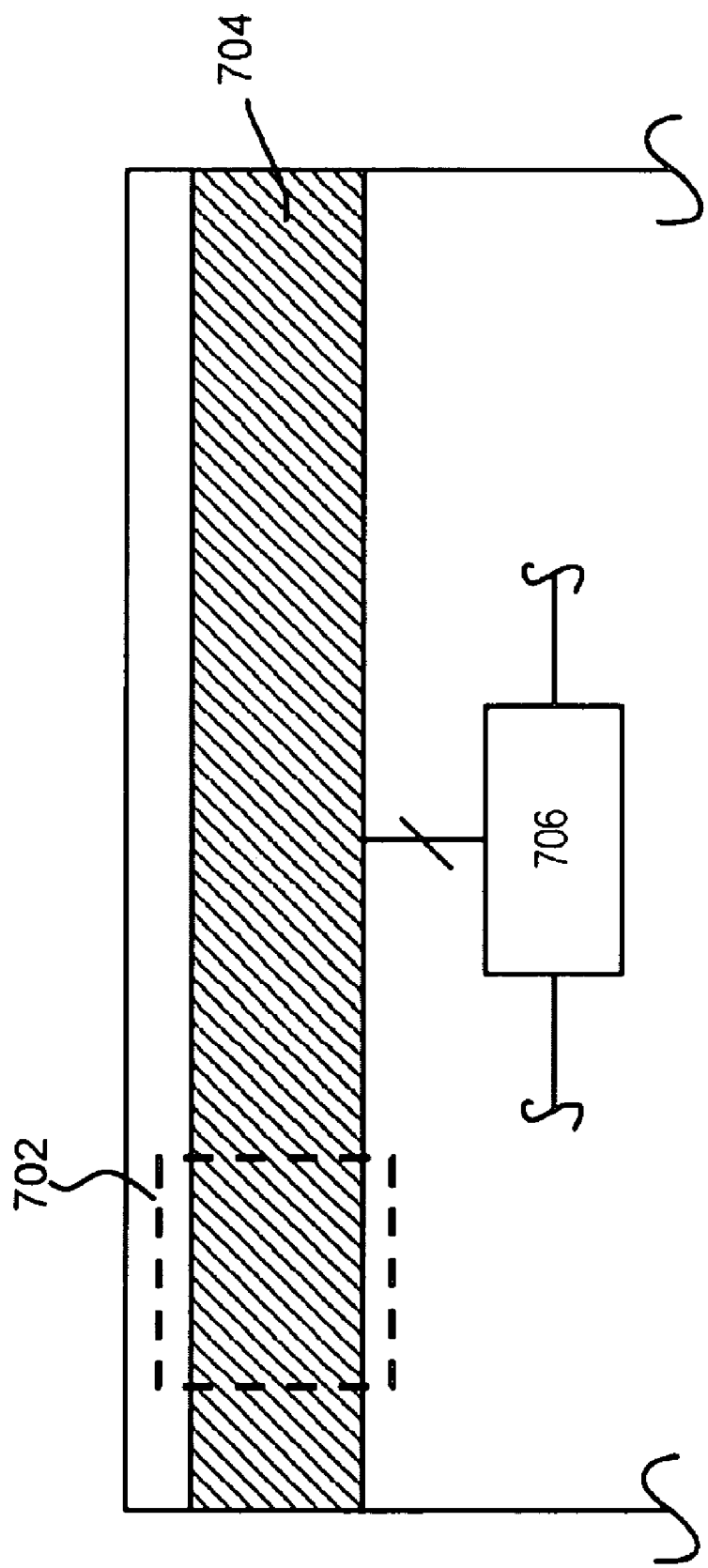
FIG. 7 shows, in accordance with an embodiment of the invention, an active modulation scheme wherein the entire dynamic reconfigurable data interface or a substantial portion thereof, i.e., the portion that is read by the magnetic head, is modulated to provide a time-varying serial data stream to the magnetic reader head.

FIG. 7 shows, in accordance with an embodiment of the invention, an active modulation scheme wherein the entire dynamic reconfigurable data interface or a substantial portion thereof, i.e., the portion that is read by the magnetic head, is modulated to provide a time-varying serial data stream to the magnetic reader head. Since data values in the serial data stream vary as a function of time and not as a function of the swiping speed, the data pattern can be reliably provided even if the swiping velocity is zero or if the swiping velocity is erratic.

With respect to FIG. 7, there is shown a magnetic head 702, representing the magnetic head of a magnetic card reader employed to read the data from the dynamically reconfigurable data interface 704. In this embodiment, dynamically reconfigurable data interface 704 is not divided into discrete magnetic stripe portions. Instead, the entire dynamically reconfigurable data interface 704 is programmed by logic circuit 706 to provide a single value to reader head 702 at any given time.

Accordingly, in accordance with this embodiment, the data values on dynamically reconfigurable data interface 704 vary as a function of time, and not as a function of the relative position of the discrete magnetic stripe portions relative to the magnetic reader head. Thus, irrespective of the position of reader head 702 relative to dynamically reconfigurable data interface 704 or of the swiping speed, the data values are still provided as a serial stream from logic circuit 706 to reader head 702 via dynamically reconfigurable data interface 704.

Figure 8:
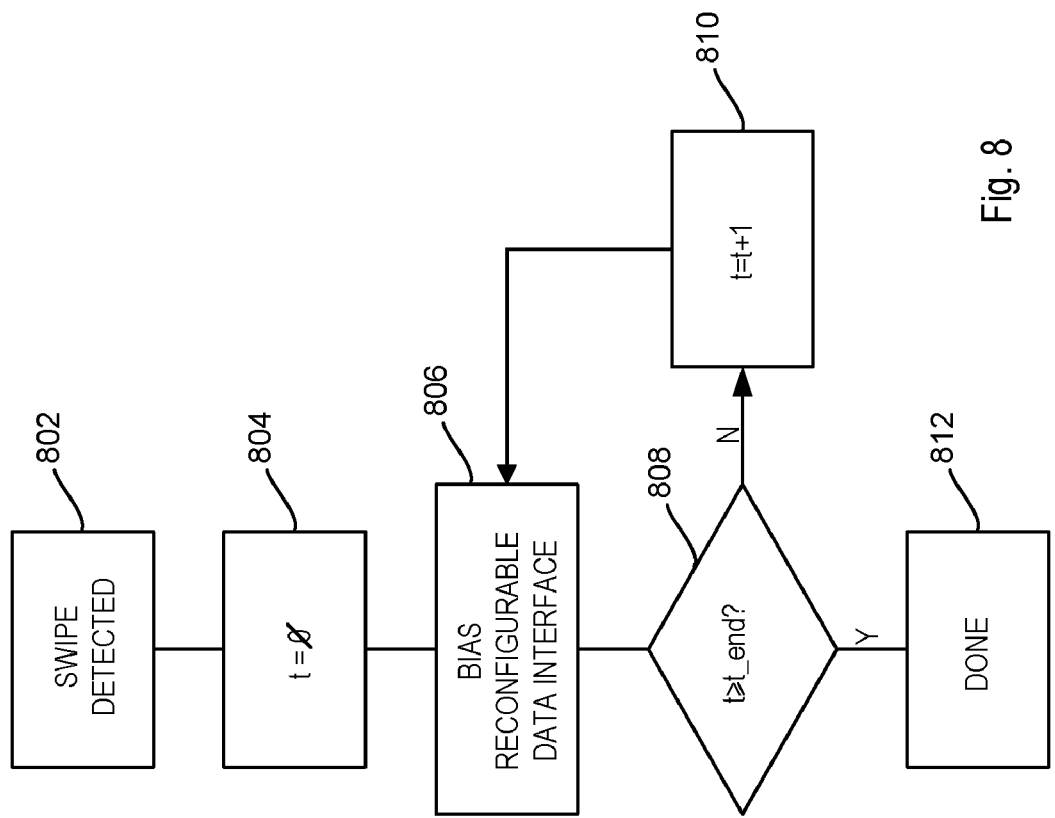
FIG. 8 shows, in accordance with an embodiment of the present invention, a simplified flow chart illustrating the steps taken in actively modulating the entire dynamically reconfigurable data interface such that data can be reliably provided to the magnetic reader head as a time-varying serial data stream.

FIG. 8 shows, in accordance with an embodiment of the present invention, a simplified flow chart illustrating the steps taken in actively modulating the entire dynamically reconfigurable data interface 704 such that data can be reliably provided to the magnetic reader head as a time-varying serial data stream irrespective of the position of reader head 702 relative to dynamically reconfigurable data interface 704 or of the swiping speed. In step 802 the beginning of the swipe is detected by the card. For example, the presence of reader head 702 may be detected by a proximity detection arrangement or by detecting the magnetic field or physical force exerted by reader head 702 or upon cardholder command. In step 804 a timer or counter t is started. In step 806, the dynamically reconfigurable data interface 704 is biased to represent a data value that varies according to timer or counter t. This data value is then presented on the dynamically reconfigurable data interface to be read by magnetic reader head 702. In step 808 it is ascertained whether the time or counter value has exceeded the total time or counter value t_end for providing the data pattern to the magnetic head.

If the value of t is less than t_end, the method proceeds to step 810 to increment t and then to step 806 wherein the next data value (which is a function of t) is provided to dynamically reconfigurable data interface 704 to be read by magnetic reader head 702. The loop that comprises step 806, step 808, and step 810 max be repeated until the entire data pattern is provided to dynamically reconfigurable data interface 704. On the other hand, if the value t is equal to or greater than t_end, the method proceeds to step 812 wherein the data transmission is considered to have been completed. The technique described in this embodiment may be combined with any of the aforementioned techniques to actuate the dynamically reconfigurable data interface 704.

As discussed earlier, the reconfigurability and backward compatibility of the data interface provides many advantages and opens the door to many applications. One application is already discussed in connection with FIG. 7, wherein the data pattern is provided as a time-varying data stream independent of the relative positioning of the reconfigurable data interface and the magnetic reader head or of the swiping speed.

Figure 9:
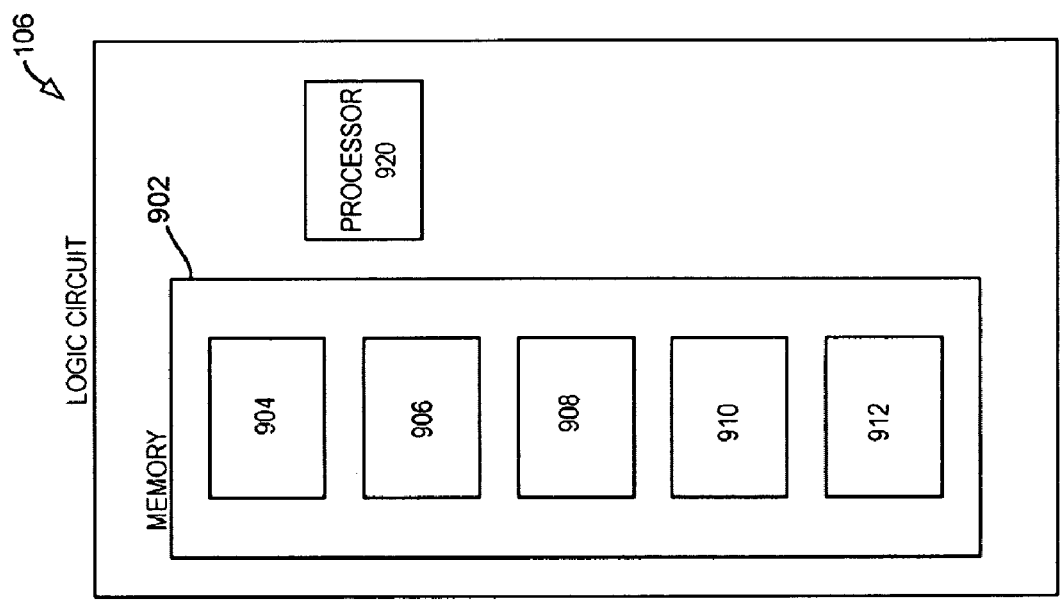
FIG. 9 shows, in accordance with an embodiment of the invention, another application wherein a single active card is employed to implement multiple accounts.

FIG. 9 shows, in accordance with an embodiment of the invention, another application wherein a single active card is employed to implement multiple accounts. The data pertaining to these multiple accounts may be stored on onboard memory 902, which may be embedded in logic circuit 106 (as shown) or external thereto. There is shown an account 904 (representing for example an American Express™ account), an account 906 (representing for example a VISA™ account), an account 908 (representing for example a MasterCard™ account), and an account 910 (representing for example a gift card account). Of course the number of accounts that can be implemented by the active credit card is unlimited or is limited, in an embodiment, only by the amount of memory provided onboard.

User input (such as user input 112) on the card may be employed to select which account would be represented by the card for a particular transaction. For example, the various accounts 904, 906, 908, and 910 may be represented by choices 1, 2, 3, 4, and the cardholder may select one of the choices in order to determine which account would be employed for the transaction. The information associated with the selected account would then be provided to the dynamically reconfigurable data interface by processor 920 in order to accomplish the transaction.

As discussed earlier, fraud prevention can now be actively undertaken using the active credit card of embodiments of the invention. One example anti-fraud technique employs a single-use token that limits the use of the card to a single transaction within a given period of time. When the cardholder wishes to conduct a transaction, a unique data pattern representing a one-time use token is generated and transmitted from the active credit card to the magnetic stripe card processing infrastructure. As mentioned, this one-time use token is limited to a particular transaction and a particular window of time. Thus, if the one-time use token is snooped by someone else who wishes to employ the snooped data for fraudulent purposes at a later time or in connection with another transaction, such use is inhibited.

Thus, in an embodiment, physical possession of the card is required at the time of a transaction attempt, thereby preventing fraud based on cloning or copying the card information. Furthermore, fraud detection methods may be used to detect and prevent an unauthorized antecedent or subsequent transaction to the legitimate transaction for which a merchant temporarily obtains physical possession of the card. For example, the issuing bank may elect not to approve multiple transactions from more than one merchant within a given time window. This time window could be chosen, for example, to be greater than the appropriate time for a merchant to return the card to the cardholder and to be less than the expected interval between unrelated transaction attempts by the cardholder. The time window could optionally be adjusted as a function of other factors, such as transaction amount, date or time, calculation of fraud risk, historical cardholder usage patterns, etc. The requirement of physical possession of the card, combined with effective use of the aforementioned and other fraud detection methods, eliminates all credit card fraud.

Figure 10:
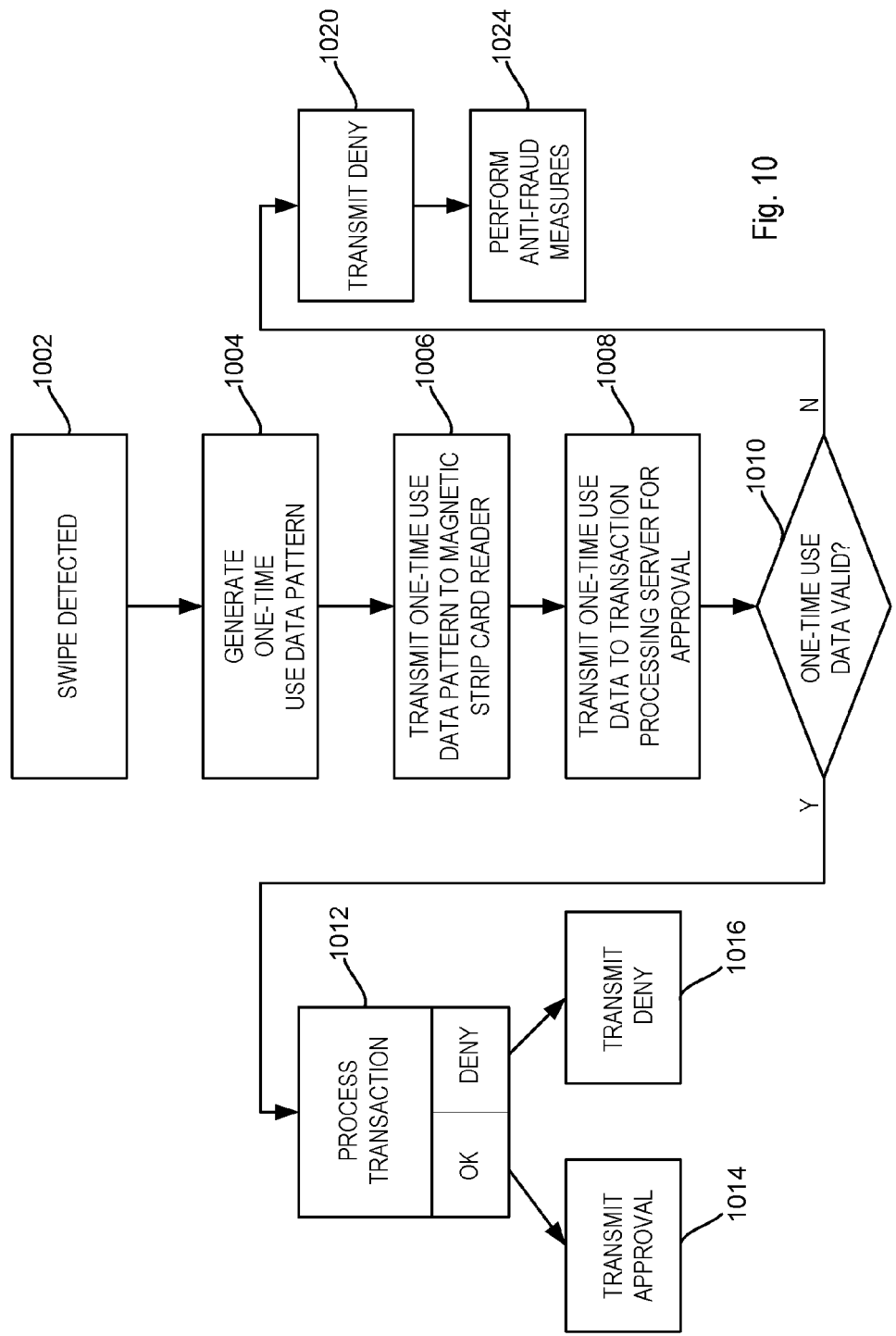
FIG. 10 shows, in accordance with an embodiment, the steps involved in implementing the one-time use anti-fraud technique via the active credit card discussed herein.

FIG. 10 shows, in accordance with an embodiment, the steps involved in implementing the one-time use anti-fraud technique via the active credit card discussed herein. In step 1002, a swipe is detected. As mentioned, this may be accomplished by detecting the proximity of the magnetic reader head to the card or by cardholder input, for example. In step 1004, a one-time use data pattern is generated. As discussed, the one-time use data pattern limits the use of the card to the transaction at hand and/or to a narrow window time period.

In step 1006, the one-time use data pattern is transmitted to the magnetic stripe reader. The transmission may be accomplished using any of the methods described earlier in connection with FIGS. 2 through 8, for example. In step 1008, the merchant's device transmits the one-time use data pattern to the transaction processing server for approval. The information that is provided in the one-time use data pattern may represent a combination of fixed data (such as the cardholder name and cardholder address which do not change from transaction to transaction) and variable data (such as the transaction amount, the transaction time, a transaction count value, output of a random number generator, etc.). The entire data pattern may then be encrypted, in an embodiment, and provided as a data pattern to the magnetic reader head via the dynamically reconfigurable data interface. Generally speaking, any suitable cryptographic approach may be employed, including for example pre-shared key and/or public key cryptography.

In an example, the one-time use data pattern is generated by cryptographically seeding the data stream with the current time of the transaction. Thus, the data pattern for a particular transaction will be encrypted using the time-seeded encryption key. If the same time-seeded encryption key is employed for two different transactions, a fraud alert is raised.

In another example, the one-time use data pattern is generated by cryptographically seeding the data stream with the transaction count associated with the account employed or with the active credit card. Thus, the data pattern for a particular transaction will be encrypted using the count-seeded encryption key. If the same count-seeded encryption key is employed for two different transactions, a fraud alert is raised.

In another example, the transaction time is provided as a value in the encrypted or unencrypted data pattern. At the transaction processing server, the transaction processing server may determine based on, for example, the time the data pattern is received and the transaction time value embedded in the received data pattern, whether the data pattern is received within a given time window that accounts for the normal delay associated with transmitting data from the merchant magnetic card reader to the transaction processing server. If the one-time use data pattern has been hijacked and is employed at a much later time in connection with another transaction, for example as part of a man-in-the-middle attack, such analysis would reveal that the one-time use data pattern is received at a later-than-expected time, and a fraud alert may be raised.

In another example, the transaction count is provided as a value in the encrypted or unencrypted data pattern. At the transaction processor, the transaction processing server may determine based on, for example, the transaction count value embedded in the received data pattern, whether the same transaction count value has been employed for two different transactions or if the transaction count value is out of sequence. If so, a fraud alert may be raised.

As can be appreciated from the foregoing, as long as a shared secret and/or asymmetric cryptosystem is employed by both the card logic and the transaction processing server to determine whether fraud has been attempted, there are many equivalent ways to implement the one-time use data pattern feature.

In step 1010, the transaction processor either validates or rejects the one-time use data pattern. If the one-time use data pattern is deemed to be valid, the method proceeds to step 1012 to further process the transaction, e.g., to confirm whether there exist sufficient funds, to perform other routine anti-fraud detection, and the like. If the transaction is approved, the method proceeds to step 1014 wherein the approval signal is transmitted back to the merchant.

On the other hand, if it is ascertained in step 1012 that the transaction cannot proceed due to, for example, insufficient funds, the method proceeds to step 1016 wherein a deny signal is sent to the merchant so that the merchant can disallow the transaction. Additionally, the determination of step 1012 may result in other responses (as desired by the specific implementation involved). An example of such other responses is a request to call the issuing institution to resolve any questions regarding the transaction, or a message to the merchant that the card is stolen, etc.

Returning to step 1010, if the transaction processor rejects the one-time use data pattern, the method proceeds to step 1020 wherein the deny signal is transmitted to the merchant. From step 1020, the method proceeds to step 1024 wherein anti-fraud action may be undertaken to address the potential fraud detected.

FIG. 11 shows, in accordance with an embodiment of the invention, the various data items that may be employed to generate the one-time use token. As can be seen in FIG. 11, an Internal Account Number (representing for example the cardholder's account number in the issuing bank's database), a profile ID (representing for example the profile chosen), additional authentication (e.g., biometric information or PIN), clock time (e.g., the time the transaction takes place), transaction count, RNG (random number generator), and any other user input or input from sensors on the card. Other data items may also be provided to generate the one-time use token. Alternatively or additionally, not all data items in FIG. 11 may be required for a specific implementation. These data items may be signed digitally or may be encrypted partially or fully (using for example the Encryption Key shown in FIG. 11). Processing of the data item and/or encryption, if desired, is performed by Synthesis and Cryptographic Processing to generate the One-Time Use Token of FIG. 11.

The one-time use token may be provided by itself to the card reader or may be combined with other data before being furnished to the card reader. FIG. 12 shows an implementation wherein the one-time use token may be combined with other data to generate the data stream to be provided to the card reader. For example, the one-time use token of FIG. 12 may be combined with other static and/or dynamic data items such as the issuer identification number (IIN), a checksum that is generated based at least in part on the one-time use token, the cardholder name (Name), the expiration date (Exp. Date), other static data such as discretionary data allocated for use by the issuing bank, and other dynamic data. In a specific implementation, not all data items shown in FIG. 12 may be required. In other implementations, additional data items may be employed if desired.

Figure 13:
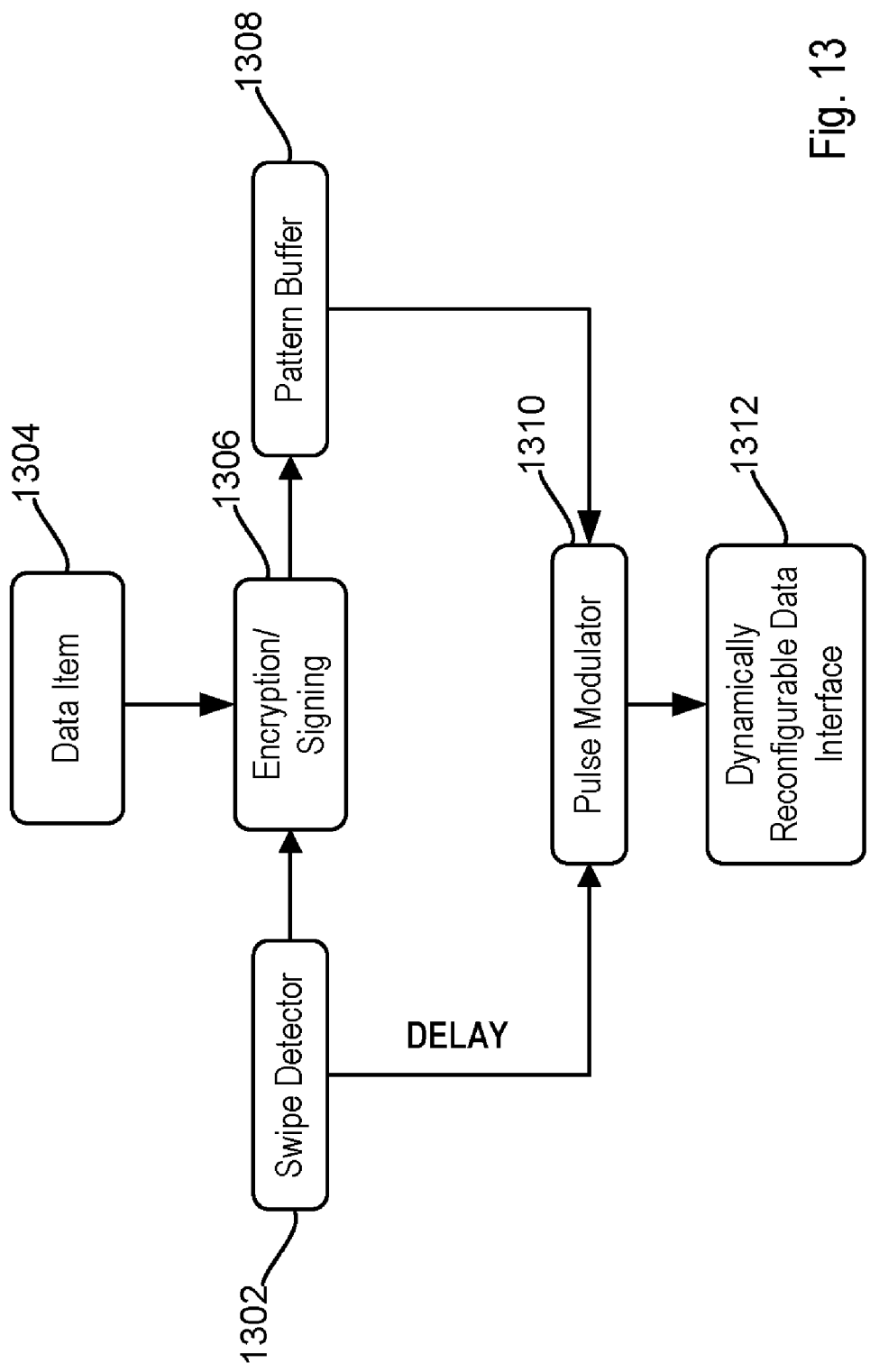
FIG. 13 shows, in accordance with an embodiment of the invention, the various actions involved in an example transaction.

FIG. 13 shows, in accordance with an embodiment of the invention, the various actions involved in an example transaction. Upon detecting the swipe direction (using swipe sensor 1302), the data items (1304) from the card (e.g., those discussed in connection with FIG. 11 and/or FIG. 12) may be encrypted and/or signed (1306). The encrypted data may be stored temporarily in a pattern buffer 1308. Once the data pattern is formed (e.g., after a delay from the time the swipe is detected), the data pattern may be provided from pattern buffer 1308, to pulse modulator circuit 1310 to manifest the data pattern on the dynamically reconfigurable data interface 1312 (e.g., to represent/encode the data pattern on the dynamically reconfigurable data interface 1312 such that the data pattern can be read by a magnetic stripe card reader). In an embodiment, the encoding may be performed in conformance with existing standards such as ISO/IEC 7813:2006.

Since the active credit card can dynamically generate a data pattern that can be read by the existing magnetic stripe card processing infrastructure, the one-time use pattern can be advantageously employed to substantially minimize fraud without requiring substantial changes to the existing magnetic stripe card processing infrastructure. Even if the fraudster can successfully apply the one-time use data pattern to accomplish a fraudulent transaction somewhere else, the fact that the one-time use data pattern is connected to a particular transaction at a particular merchant and has a limited valid time window would greatly assist in any subsequent fraud investigation since the identity of the merchant associated with the valid transaction, the identity of the merchant associated with the fraudulent transaction, and the time window within which the fraud occurs are readily ascertainable.

In an embodiment, the potential loss due to fraud may be limited by requiring the cardholder to provide additional authentication information that is known only by the cardholder (e.g., using the cardholder's mother maiden name or a PIN, for example) when certain conditions, such as transaction limits, are met. The additional authentication, as well as other anti-fraud features discussed herein, may be implemented on an account-specific or profile-specific basis. In other words, different accounts and/or different profiles implemented by the card may implement different (or the same, if desired) anti-fraud measures.

In an example, the issuing institution may allow the cardholder to conduct transactions without additional authentication only if, for example, the amount of the transaction is below a certain amount, or if the total amount spent since last authenticated is below a certain amount, or if the number of transactions conducted since last authenticated is below a certain number, or if the time since last authenticated is below a certain value, or if the type of transaction is limited to certain transaction types. If these transaction limitations are met or exceeded, the cardholder is asked to provide the additional authentication information, via the cardholder input mechanism on the card or via other means (e.g., phone, SMS, email, web, service terminal, etc.), before the transaction is authorized.

This additional authentication serves the purpose of limiting the loss to the cardholder in the event the card is lost or stolen. This authentication method also limits loss to the card issuer since many card issuers have a policy of guaranteeing payment even if fraud is perpetrated. In some cases, it has been found that the cardholder may attempt to defraud the card issuer by conducting a transaction and then claiming that the card has been fraudulently used. By requiring the cardholder to enter additional authentication that is known only to the cardholder before a large transaction or a transaction exceeding predefined limitations is authorized, this authentication approach makes it difficult for the cardholder to later claim that he or she does not know of or did not authorize the transaction that took place.

Both the one-time use data pattern and the additional authentication technique protect the merchant since many merchants are often penalized by the card issuer for fraudulent activities by third parties. By limiting the extent of fraud-related loss (as facilitated by the additional authentication requirement) or by limiting the ability of a fraudster to use the data for a different transaction than that intended by the cardholder (as facilitated by the one-time use token), the merchant is protected from fraud to a greater degree than possible in the past.

As can be appreciated from the foregoing, embodiments of the invention allow the active credit card to take advantage of the existing magnetic stripe card processing infrastructure while enabling the implementation of many advantageous convenience and anti-fraud features. Since the reconfigurable data interface is compatible with the existing magnetic stripe card processing infrastructure, the migration path to the inventive technology is simplified in that it is not necessary to replace the millions of magnetic card readers and transaction processing servers that are already in place.

Since the data pattern can be dynamically reconfigured via the dynamically reconfigurable data interface, convenience is greatly improved. For example, multiple accounts may now be implemented in a single physical form factor, and it is also possible to implement multiple profiles for each account. To elaborate, in an embodiment, a given account may be associated with multiple profiles. Thus, the cardholder may not only select which account is chosen for the transaction but also which profile. In an embodiment, the chosen account and/or profile is shown to the user on the card's LCD display so that the user can visually confirm for himself that the correct account and/or profile has been chosen.

For example, a given credit card account may be associated with a business profile and a personal profile. The cardholder may select the business profile to accomplish the transaction when the credit card is employed for business transactions. When the credit card is employed for a personal purchase, the personal profile may be selected instead. Each of these profiles may be associated with different identification data to allow the issuer to properly account to the cardholder which profile or account of the cardholder has been employed. Thus, accounting is simplified and furthermore, the issuer can sell the feature of having multiple profiles per account as a premium feature to enhance revenue to the issuer.

Since multiple accounts can be kept centralized in a single physical form factor, credit card management and replacement in the case of loss or damage is greatly simplified, resulting in time and money savings for both the card issuer and the cardholder.

As discussed, the dynamically reconfigurable data interface feature provides strong anti-fraud advantages. For example, if the data required to accomplish the transaction is provided as a one-time use data pattern that is limited to a particular transaction and/or a particular time window and/or a particular transaction number sequence, that one-time use data pattern cannot be snooped and fraudulently employed for other transactions. Additionally, merchants or dishonest employees of the merchants cannot easily clone the active credit card for subsequent fraudulent uses.

Furthermore, no visual indication of sensitive data such as embossed credit card numbers or names or expiration dates need to be provided on the active credit card, thereby rendering it impossible for a person standing nearby to snoop and memorize the data necessary to commit fraud at a later time. If the transaction needs to take place in a manner that does not involve swiping, the one-time use token can be displayed on the card's display, allowing the cardholder to read off the one-time use token to accomplish the transaction. Even if someone can overhear this one-use token, the data pattern of the one-use token is useless for fraudulent purposes at a later time or in connection with another transaction.

Additionally or alternatively, if the ability to make an impression of the card is desired, a static credit card number could be embossed on the card, as in the prior art. However, the use of this number may be restricted to paper slips or other methods that require the cardholder to approve the transaction in person by signing the receipt, thereby minimizing the possibilities for fraudulent use of the static credit card number. In addition, the fraud detection methods applied to transactions using this account number may be specialized for this contingency and/or tuned by increasing sensitivity.

While this invention has been described in terms of several embodiments, there are alterations, permutations, and equivalents, which fall within the scope of this invention. It should also be noted that there are many alternative ways of implementing the methods and apparatuses of the present invention. For example, although the examples herein refer to the use of the one-time use token, N-time use tokens (wherein N is any integer other than zero and may be configured as desired by the context) may also be employed.

As another example, the inventive card may be provided with swipe direction detector to enable the card reader to determine the swipe direction. In some cases, accurate reading of the data pattern requires a specific swipe direction (e.g., from left to right). By including a swipe direction detector (which may be implemented, for example, at both edges of the dynamically reconfigurable data interface), it is possible for the card to dynamically determine the swipe direction before representing or encoding the data on the dynamically reconfigurable data interface so that the data stream is always provided in the expected order irrespective of the swipe direction. For example, if a card reader expects a left-to-right swiping direction to decode the pattern a-b-c, the swiping of the inventive card in the right-to-left direction would trigger the swipe detector on the left side of the card, thereby causing the magnetizing order to provide the data pattern in the c-b-a order on the dynamically reconfigurable data interface. In this manner, the reader will be able to decode the correct pattern a-b-c even when the card is swiped in the right-to-left direction.

As another example, while the magnetic card reader is discussed, it is possible for a card reader to employ a different technology. For example, the card and/or the card reader may employ electrical transmission technology for transmission purposes. As another example, gift cards may employ bar coding for representing the data. In this case, the dynamically reconfigurable data interface may represent bar code reader compatible interface (e.g., a LCD screen that can display the bar code to be read by a bar code reader). In this case, the card reader should be understood to be one that employs an appropriate bar code reading technology (such as a laser diode or optical scanner), and the reconfiguration controller should be understood to be a controller for controlling the display on the bar code reader compatible interface to generate bar code data that is readable by the bar code reader. Further, in the bar code case for example, the dynamically reconfigurable data interface should be understood to be one that is compatible with the reader configured for reading statically printed bar codes.

Multiple sensors may also be provided on the card. These multiple sensors may be of the same type or may represent different types of sensors (e.g., capacitance, inductance, pressure, biometric, etc.) to improve accuracy in determining whether a card swipe is about to take place (so that the data can be provided to the dynamically reconfigurable data interface at the appropriate time or in the appropriate order) and/or to identify the human user handling the card (e.g., by reading a thumbprint as the human user grasps the card). These sensors may be provided anywhere on or in the card as needed without limitation.

As another improvement, a charging system or arrangement may be provided in the enclosure that is employed to store the card. For example, many cards are carried in the cardholder's wallet. The wallet may be provided with a battery so that the card can be charged (via a contact or contactless method such as magnetic induction) while being stored in the wallet. Alternatively or additionally, the wallet may be provided with an arrangement to translate the opening/closing of the wallet and/or the removal/insertion of the card into a small electrical charge sufficient to charge or "top-off" the card for use.

Additionally, it is intended that the abstract section, having a limit to the number of words that can be provided, be furnished for convenience to the reader and not to be construed as limiting of the claims herein. The abstract of the disclosure, being highly abbreviated in length to comply with patent rules, is not intended to be used to construe in a way that limits the claims of the invention. It is therefore intended that the following appended claims be interpreted as including all such alterations, permutations, and equivalents as fall within the true spirit and scope of the present invention.

What is claimed is:

1. An active stripe card compatible with a magnetic stripe card reader that is configured to read statically implemented magnetic stripe cards, said active stripe card being configured to exchange data with said magnetic stripe card reader, comprising:
a card base;
a dynamically reconfigurable data interface disposed on said card base, said dynamically reconfigurable data interface having at least a set of dynamically reconfigurable data bearing portions that includes at least a first dynamically reconfigurable data bearing portion;
reconfiguration controller circuitry coupled to said set of dynamically reconfigurable data bearing portions;
control logic circuitry coupled to said reconfiguration controller circuitry, said control logic circuitry being configured to provide a first data pattern to said reconfiguration controller circuitry to cause a second data pattern that includes at least a portion of the information contained in said first data pattern to be manifested on said dynamically reconfigurable data interface, thereby rendering said second data pattern to be readable by said magnetic stripe card reader, wherein at least one of said first data pattern and said second data pattern represents a time-varying serial data stream, wherein each data value in said time-varying serial data stream is a function of time; and
a swipe direction detector coupled with said control logic circuitry, wherein each of said first data pattern and said second data pattern changes responsive to a swipe direction of said active card with respect to said card reader, said swipe direction ascertained via said swipe direction detector.

2. The active stripe card of claim 1 wherein said dynamically reconfigurable data interface includes at least a plurality of tracks associated with different data fields, said plurality of tracks including at least a first track and a second track, said first track disposed closer to a longer edge of said card base than said second track.

3. The active stripe card of claim 1 wherein said dynamically reconfigurable data bearing portions includes a plurality of dynamically reconfigurable data bearing portions, individual ones of said plurality of dynamically reconfigurable data bearing portions being independently reconfigurable with data values by said reconfiguration controller circuitry.

4. The active stripe card of claim 1 wherein all data bearing portions in said active stripe card represent volatilely reconfigurable data bearing portions.

5. The active stripe card of claim 1 wherein said set of dynamically reconfigurable data bearing portions represent permanently reconfigurable data bearing portions.

6. The active stripe card of claim 1 further including a card holder input arrangement coupled to said control logic circuitry for providing card holder input data to said control logic circuitry.

7. The active stripe card of claim 6 wherein said card holder input arrangement represents at least one of a set of buttons and a touch screen.

8. The active stripe card of claim 6 wherein said card holder input arrangement represents a biometric input device.

9. The active stripe card of claim 1 wherein said card base includes a set of static data bearing portions for manifesting static data, said static data being configured to be read by said magnetic stripe card reader.

10. The active stripe card of claim 1 wherein said control logic circuitry includes an encryption engine configured to encrypt information pertaining to a particular account prior to providing said information pertaining to said particular account in said first data pattern.

11. The active stripe card of claim 10 wherein said encryption engine implements public key encryption.

12. The active stripe card of claim 10 wherein said encryption engine implements pre-shared key encryption.

13. The active stripe card of claim 1 wherein said control logic circuitry is configured to generate N-time use tokens for use in conduction of transactions using said active stripe card.

14. The active stripe card of claim 1 wherein said control logic circuitry is configured to generate one-time use tokens for use in conduction of transactions using said active stripe card.

15. The active stripe card of claim 1 wherein said control logic includes memory configured for storing information pertaining to a plurality of accounts, wherein one of said plurality of accounts is selectable by a card holder of said active stripe card for conducting a transaction.

16. The active stripe card of claim 1 wherein said control logic includes memory configured for storing information pertaining to a plurality of profiles associated with an account, wherein one of said plurality of profiles is selectable by a card holder of said active stripe card for conducting a transaction.

17. The active stripe card of claim 1 wherein said second data pattern includes card holder authentication data entered by a card holder using a card holder input arrangement that is disposed on said active stripe card.

18. The active stripe card of claim 17 wherein said user-inputted authentication data is employed by said control logic circuitry for only a subset of transactions that are conducted using said active stripe card.

19. The active stripe card of claim 1 wherein said second data pattern manifested by said dynamically reconfigurable data interface for a first transaction is different from said second data pattern manifested by said dynamically reconfigurable data interface for a second transaction.

20. The active stripe card of claim 1 further comprising a battery configured to provide electrical power at least to said control logic circuitry.

21. An active card compatible with a card reader, said card reader representing one of a card reader that is configured to read statically implemented magnetic stripe cards and a bar code reader that is configured to read statically printed bar codes, said active card being configured to exchange data with said card reader, comprising:
  a card base;
  dynamically reconfigurable data providing means attached to said card base, said dynamically reconfigurable data providing means being configured to provide said card reader a first data pattern for a first transaction that is different from a second data pattern for a second data transaction, said second data pattern also provided to said card reader by said dynamically reconfigurable data providing means, wherein at least one of said first data pattern and said second data pattern represents a time-varying serial data stream, wherein each data value in said time-varying serial data stream is a function of time; and
  a swipe direction detector coupled with said dynamic reconfigurable data providing means, wherein each of said first data pattern and said second data pattern changes responsive to a swipe direction of said active card with respect to said card reader, said swipe direction ascertained via said swipe direction detector.

22. The active card of claim 21 wherein said dynamically reconfigurable data providing means includes a dynamically reconfigurable data interface representing a data interface configured for providing data readable by said card reader.

23. The active card of claim 22 wherein said dynamically reconfigurable data providing means includes control logic circuitry configured to provide information to said dynamically reconfigurable data interface to manifest said first data pattern and said second data pattern for reading by said card reader.

24. The active card of claim 23 wherein said dynamically reconfigurable data providing means includes magnetizing controller circuitry communicatively coupled with said control logic circuitry for magnetizing a set of dynamically reconfigurable data bearing portions implemented on said dynamically reconfigurable data interface.

25. The active card of claim 23 wherein said set of dynamically reconfigurable data bearing portions represent volatilely reconfigurable data bearing portions.

26. The active card of claim 23 wherein said set of dynamically reconfigurable data bearing portions represent permanently reconfigurable data bearing portions.

27. The active card of claim 23 wherein said dynamically reconfigurable data providing means includes a card holder input arrangement coupled to said control logic circuitry for providing card holder input data to said control logic circuitry.

28. The active card of claim 23 wherein said control logic circuitry includes an encryption engine configured to encrypt information pertaining to a particular account prior to providing said information pertaining to said particular account in said first data pattern.

29. The active card of claim 28 wherein said encryption engine implements public key encryption.

30. The active card of claim 28 wherein said encryption engine implements pre-shared key encryption.

31. The active card of claim 23 wherein said control logic circuitry is configured to generate N-time use tokens for use in conduction transactions using said active card, wherein N represents an integer that is greater than zero.

32. The active card of claim 23 wherein said control logic includes memory configured for storing information pertaining to a plurality of accounts, wherein one of said plurality of accounts is selectable by a card holder of said active card for conducting a transaction.

33. The active card of claim 23 wherein said control logic includes memory configured for storing information pertaining to a plurality of profiles associated with an account, wherein one of said plurality of profiles is selectable by a card holder of said active card for conducting a transaction.

34. The active card of claim 21 wherein said first data pattern includes card holder authentication data entered by a card holder using a card holder input arrangement that is disposed on said active card.

35. The active card of claim 34 wherein said user-inputted authentication data is employed for only a subset of transactions that are conducted using said active card.

36. The active card of claim 21 wherein said dynamically reconfigurable data providing means includes at least a plurality of tracks associated with different data fields, said plurality of tracks including at least a first track and a second track, said first track disposed closer to a longer edge of said card base than said second track.

* * * * *